US011021621B2

(12) United States Patent
Wang et al.

(10) Patent No.: US 11,021,621 B2
(45) Date of Patent: Jun. 1, 2021

(54) PHOTOCURABLE 3D PRINTING POLYIMIDE INK, AND PREPARATION METHOD AND APPLICATION THEREOF

(71) Applicant: Lanzhou Institute of Chemical Physics, Chinese Academy of Sciences, Lanzhou (CN)

(72) Inventors: Xiaolong Wang, Lanzhou (CN); Yuxiong Guo, Lanzhou (CN); Xiaoqin Zhang, Lanzhou (CN); Zhengfeng Ma, Lanzhou (CN); Pan Jiang, Lanzhou (CN); Feng Zhou, Lanzhou (CN)

(73) Assignee: Lanzhou Institute of Chemical Physics, Chinese Academy of Sciences, Lanzhou (CN)

( * ) Notice: Subject to any disclaimer, the term of this patent is extended or adjusted under 35 U.S.C. 154(b) by 450 days.

(21) Appl. No.: 15/942,776

(22) Filed: Apr. 2, 2018

(65) Prior Publication Data
US 2019/0169450 A1 Jun. 6, 2019

(30) Foreign Application Priority Data

Dec. 1, 2017 (CN) .......................... 201711251353.9

(51) Int. Cl.
*C09D 11/107* (2014.01)
*C09D 11/03* (2014.01)
(Continued)

(52) U.S. Cl.
CPC ........ *C09D 11/107* (2013.01); *B29C 35/0805* (2013.01); *B33Y 70/00* (2014.12); *C09D 11/03* (2013.01); *C09D 11/101* (2013.01); *B29C 64/112* (2017.08); *B29C 2035/0827* (2013.01); *B29K 2079/08* (2013.01); *B29K 2105/0058* (2013.01); *B33Y 10/00* (2014.12)

(58) Field of Classification Search
CPC .................................... C09D 11/107
See application file for complete search history.

(56) References Cited

FOREIGN PATENT DOCUMENTS

KR      101474319     * 12/2014

OTHER PUBLICATIONS

English translation of KR 101474319.*

* cited by examiner

*Primary Examiner* — Larry W Thrower
(74) *Attorney, Agent, or Firm* — Wood Herron & Evans LLP

(57) ABSTRACT

The present invention relates to the field of 3D printing technology, and provides a photocurable 3D printing polyimide ink, and a preparation method and application thereof. The photocurable 3D printing polyimide ink includes the following components in the following weight percentages: 40 to 60% of a photocurable polyamic acid, 5 to 40% of an organic solvent, 10 to 50% of a reactive diluent, 1 to 10% of a chain extender, and 1 to 3% of a photoinitiator. The photocurable 3D printing polyimide ink provided by the present invention has excellent mechanical properties, thermal stability, relatively high printing accuracy and relatively low shrinkage; a molded device obtained by 3D printing has excellent properties including high accuracy, great dimensional stability, high strength and corrosion resistance, excellent flexibility, high temperature resistance and relatively low shrinkage. The method for preparing the photocurable 3D printing polyimide ink has a simple process and lower energy consumption.

8 Claims, 2 Drawing Sheets

(51) Int. Cl.
  *B29C 35/08* (2006.01)
  *B33Y 70/00* (2020.01)
  *C09D 11/101* (2014.01)
  *B29K 105/00* (2006.01)
  *B33Y 10/00* (2015.01)
  *B29K 79/00* (2006.01)
  *B29C 64/112* (2017.01)

PHOTOCURABLE 3D PRINTING POLYIMIDE INK, AND PREPARATION METHOD AND APPLICATION THEREOF

CROSS-REFERENCE TO RELATED APPLICATION

This application claims priority to Chinese Application Number 201711251353.9, filed Dec. 1, 2017, with the same title as shown above for this application. The above-mentioned patent application is incorporated herein by reference in its entirety.

TECHNICAL FIELD

The present invention relates to the field of 3D printing technology, and particularly to a photocurable 3D printing polyimide ink, and a preparation method and application thereof.

BACKGROUND 3D printing is a rapid three-dimensional integrated manufacturing technology developed rapidly in recent years, which can also be referred to as "rapid prototyping technology" and "additive manufacturing technology." The prototyping manufacturing principle of 3D printing includes decomposing a three-dimensional model designed by a computer into several layers of plane slices, and then laminating printing materials layer by layer according to slice patterns by a 3D printing machine, to finally stack the printing materials into a complete object. In contrast to the "subtractive manufacturing technology" in the traditional manufacturing industry, the 3D printing follows an additive principle, which can transform a design in a computer directly into a model, to make a part or product directly without needing any traditional knife, clamp, and machine tool. The 3D printing technology has advantages of enabling integration of design and manufacturing, reducing the manufacturing cost by about 50%, and shortening the processing cycle by about 70%.

With continuous development of digital technology and computer control technology, 3D printing rapid prototyping technology has been developed into dozens of print manufacturing technology according to different materials and application requirements. The 3D printing rapid prototyping technology is usually divided into two categories: one is a rapid preparation technology based on laser technology, such as stereolithography (SLA), selective laser sintering (SLS), selective laser melting (SLM), and the like; and the other is a rapid prototyping method according to hot melting, UV and the like technologies rather than laser manufacturing, such as fused deposition modeling (FDM), 3D printing technology (3DP), digital light processing (DLP), and the like rapid prototyping technologies.

In respect of the current research and application situations, the most-used and most widely applied technologies mainly include the following five technologies: SLA, SLS, FDM, DLP, 3DP and the like technologies respectively. For SLA and DLP photocurable 3D print prototyping technologies, the development and practical characteristics of a photosensitive material have severely limited further development of both technologies, and thus the research and development of a photosensitive resin material with practical characteristics facilitate further application of both technologies.

In foreign countries, up to now, the photosensitive resin applied in 3D printing stereolithography rapid prototyping can be divided into two types, one is a free-radical-type photosensitive resin, which is a stereolithography rapid prototyping photosensitive resin commercialized early in 1988 to 1995, and belongs to a free radical photosensitive resin since the photosensitive prepolymer thereof is an acrylate prepolymer; the main advantage of the free-radical-type photosensitive resin is the great photosensitivity, but the shrinkage at polymerization of the resin is relatively large, and thus a part manufactured from such a resin has poor precision, and is liable to warping and deforming, such that the accuracy of the part is difficult to meet requirements; and the other one is a 3D printing stereolithography rapid prototyping photosensitive resin commercialized after 1995, the photosensitive prepolymer of which containing both acrylate and epoxy resin. In China, the units producing 3D printing stereolithography rapid prototyping devices mainly include the advanced manufacturing technology institute of Xi'an Jiaotong University, Shanghai Luen Thai Company and the Rapid Prototyping Center in Huazhong University of Science and Technology. The stereolithography rapid prototyping devices developed by these units each has a cost performance which reaches the level of that of 3D Systems company in the United States. However, up to now, most of the photosensitive resins matched to their devices still need to be imported from photosensitive resins of company in the United States. Therefore, it is very important to research a photosensitive resin with a high performance in 3D printing and localize the same.

Currently, relatively mature and commercialized photocurable 3D printing photosensitive resin material mainly includes acrylates, allyl resins, polyurethane-based resins, epoxy resins, etc. However, these resins have their respective advantages and disadvantages: epoxy acrylate cures fast, but has great brittleness; polyurethane acrylate has good toughness, but has small shrinkage and is more expensive; unsaturated polyester is cheap, but cures slowly; and polyester acrylate has low viscosity, but poor mechanical properties. Common cationic prepolymers mainly include epoxy compounds and vinyl ethers, and cationic photocurable resin has a relatively small shrinkage after being cured, but the curing rate thereof is relatively slow. A molded device printed with the above resin materials is disadvantageous in that it has a poor mechanical strength, a poor high temperature resistance, is liable to hydroscopic swelling and has poor chemical stability, and most of them can only be used in an environment below 100° C. Therefore, their application is mainly limited to models, devices, design verification and production of art products, and it is difficult to break through the bottleneck problem of directly manufacturing components and parts.

Although the polyimide photosensitive resin material has an excellent overall performance, such as high heat resistance, great chemical stability, media resistance and corrosion resistance, and excellent mechanical properties, etc.; however, since polyimide oligomer is hardly soluble in a reactive diluent during resin preparation, the viscosity of the system is increased and the mobility of the system is reduced. Therefore, during the 3D printing rapid prototyping, there are processing problems such as being hardly soluble and refractory, which cause that the mechanical properties and accuracy of the molded device as printed are also not met.

SUMMARY

An objective of the present invention is to combine a photosensitive polyimide material with a 3D printing technology to provide a photocurable 3D printing polyimide ink, and a preparation method and application thereof. When used in 3D printing, the 3D printing polyimide ink provided by the present invention has excellent performances, such as high accuracy, good dimensional stability, high strength and corrosion resistance, excellent flexibility, high temperature resistance and relatively low shrinkage.

To achieve the above invention objective, the present invention provides the following technical solutions:

The present invention, in one embodiment, provides a photocurable 3D printing polyimide ink, which includes the following components in the following weight percentages:

photocurable polyamide acid: 40-60%;
organic solvent: 5-40%;
reactive diluent: 10-50%;
chain extender: 1-10%; and
photoinitiator: 1-3%.

In one aspect, the photocurable polyamic acid is a polyamic acid grafted with a methacryloyl reactive group in the backbone structure.

In another aspect, a grafting ratio of the methacryloyl reactive group is from 10% to 50%.

In a further aspect, the organic solvent includes one or more of tetrahydrofuran, sulfolane, pyrrolidone, methyl halide, ketone organic solvents and amide organic solvents.

In some embodiments, the reactive diluent includes one or more of acrylic acid, styrene, γ-(methacryloyloxy)propyltrimethoxysilane, N-vinylpyrrolidone, cyclotrimethylolpropane formal acetal, glycidyl methacrylate and acrylate diluents.

In further embodiments, the chain extender includes one or more of acrylic acid, ethoxylated pentaerythritol tetraacrylate and trimethylol propane triacrylate.

In one aspect, the photoinitiator includes one or more of dimethoxybenzoin, benzophenone, diacylphosphine oxide, dibenzoyl peroxide, 2-hydroxy-2-methyl-1-phenylacetone, ethyl 4-dimethylaminobenzoate, azobisisobutyronitrile, 1-hydroxycyclohexyl phenyl ketone, and 2-hydroxy-4'-(2-hydroxyethoxy)-2-methylpropiophenone.

The present invention in another embodiment further provides a method for preparing the aforementioned photocurable 3D printing polyimide ink, which includes the following steps:

mixing a photocurable polyamic acid, an organic solvent, a reactive diluent, a chain extender and a photoinitiator in specific weight percentages to obtain a mixed material; and centrifuging the mixed material to obtain a slurry, namely, the photocurable 3D printing polyimide ink.

In one aspect, a centrifugation rate is from 5,000 to 10,000 r/min, and a centrifugation time is from 10 to 20 min.

The present invention further provides an application of the aforementioned photocurable 3D printing polyimide ink or the photocurable 3D printing polyimide ink obtained by the preparation method in 3D printing.

The present invention provides a photocurable 3D printing polyimide ink, which includes the following components in the following weight percentages: 40 to 60% of a photocurable polyamic acid, 5 to 40% of an organic solvent, 10 to 50% of a reactive diluent, 1 to 10% of a chain extender; and 1 to 3% of a photoinitiator. For the photocurable 3D printing polyimide ink provided by the present invention, since the molecular chain segment of the photocurable polyamic acid has lower crystallinity and facilitates dissolution of molecular groups, it enables the ink to physically crosslink with the organic solvent and the reactive diluent to form a homogeneous plastic fluid in a viscous state, and also the addition of the chain extender and the photoinitiator can make the ink be subjected to a rapid photo crosslinking chemical reaction under the action of UV, thereby achieving the photocurable 3D printing prototyping. The photocurable 3D printing polyimide ink provided by the present invention has excellent mechanical properties, and the results of the embodiments show that, by using the 3D printing polyimide ink provided by the present invention, the device molded through 3D printing has a tensile strength of 105-135 MPa, a breaking elongation of 15% to 20%, a hardness of 500-700 MPa, an elastic modulus of 3100-3550 MPa; the device has relatively high thermal stability, a glass transition temperature up to 254-300° C., relatively high printing accuracy of 135-150 and lower shrinkage of 1.3%-2%.

In the preparation method provided by the present invention, it only needs to mix the aforementioned raw components and then centrifuge the mixture, so that the preparation process is simple and the energy consumption is low.

The photocurable 3D printing polyimide ink prepared by the present invention is applicable to all 3D printing manners, and in particular, it has a more excellent printing effect in photocurable 3D printing prototyping such as SLA, DLP and light-assisted direct extrusion, and the ink material is applied widely, and there is no such product known in any jurisdiction, which is beneficial for commercialized production of products and has a great commercial value.

BRIEF DESCRIPTION OF THE DRAWINGS

Various additional features and advantages of the invention will become more apparent to those of ordinary skill in the art upon review of the following detailed description of one or more illustrative embodiments taken in conjunction with the accompanying drawings. The accompanying drawings, which are incorporated in and constitute a part of this specification, illustrate one or more embodiments of the invention and, together with the general description given above and the detailed description given below, explain the one or more embodiments of the invention.

DETAILED DESCRIPTION

Figure 1:
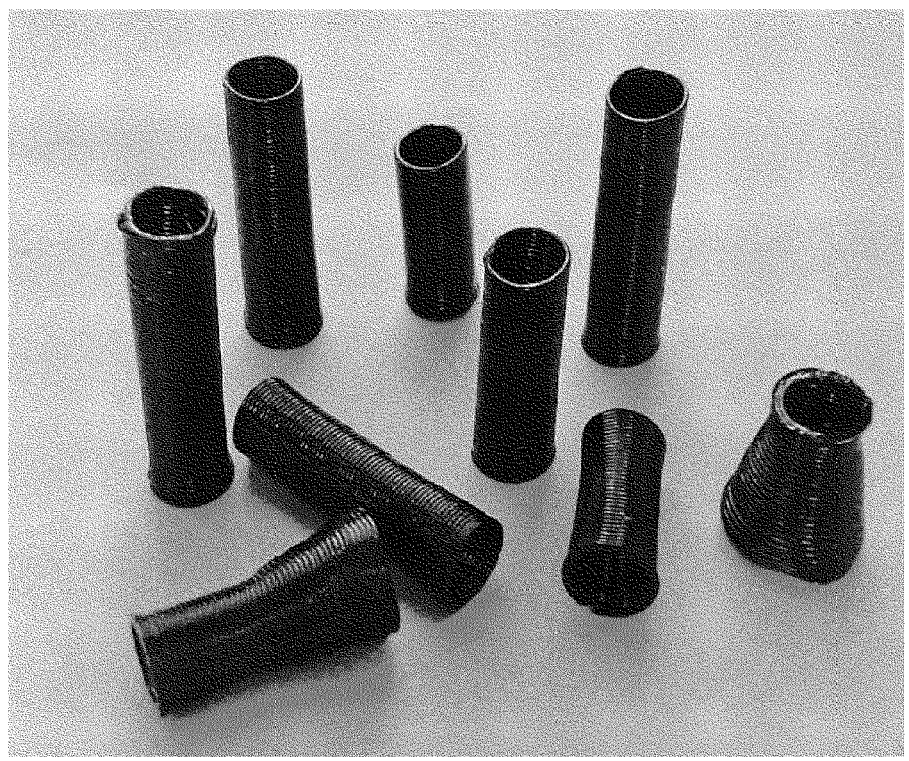
FIG. 1 is a molded oil duct obtained through 3D printing from a photocurable 3D printing polyimide ink prepared in an Embodiment 1 of the invention described below.

The present invention provides a photocurable 3D printing polyimide ink, which includes the following components in the following weight percentages:

photocurable polyamide acid: 40-60%;
organic solvent: 5-40%;
reactive diluent: 10-50%;
chain extender: 1-10%; and
photoinitiator: 1-3%.

The photocurable 3D printing polyimide ink provided by the present invention includes 40 to 6%, preferably 45 to 55%, and more preferably 50% of the photocurable polyamic acid in weight percentage.

In the present invention, the photocurable polyamic acid in the art means polyamic acids grafted with a photocurable active group, each of which is capable of initiating a photocuring reaction; in the present invention, the photocurable polyamic acid is preferably a polyamic acid grafted with a methacryloyl reactive group in the backbone structure; and the purpose of grafting the methacryloyl reactive group in the present invention is to introduce a photocuring factor for carrying out a photocuring reaction in the subsequent process, and meanwhile to increase the solubility of the ink. In the present invention, the grafting ratio of the methacryloyl reactive group is preferably from 10% to 50%, and more preferably from 20 to 30%, and the grafting ratio in the above range enables excellent photosensitivity and relatively low shrinkage during printing.

In the present invention, it is preferred that a isocyano condensation reaction occurs between the polyamic acid raw material and isocyanatoethyl methacrylate in the presence of a catalyst to obtain a polyamic acid grafted with a methacryloyl reactive group.

In the present invention, there is no particular restriction on the origin of the polyamic acid raw material, and it only needs to use a commercially available product which can realize the scheme. The models of the commercially available polyamic acid raw materials recited in the present invention preferably includes one or more of PI-100, PI1000, PAA, PY1001, PI-84 and TPI.

In the present invention, the number average molecular weight of the polyamic acid is preferably 5,000 to 500,000, and more preferably 10,000 to 100,000. In the present invention, through research it is found that the molecular weight of the polyamic acid has a special influence on the performance of the ink and the 3D printing prototyping. The ink and the printed product will have poor performances if the molecular weight of the polyamic acid is too small, and the ink cannot be easily molded if the molecular weight of the polyamic acid is too large, such that controlling the molecular weight of the polyamic acid in the above range can not only ensure the printing prototyping, but also meet the requirements on the performance after printing of the ink.

In the present invention, the catalyst preferably includes one or more of a strong acid, a soluble sulfate, a titanate, a zinc oxide, a zinc acetate and a cation exchange resin; the strong acid preferably includes one or more of benzenesulfonic acid, concentrated sulfuric acid and concentrated hydrochloric acid, there is no special requirement for the concentration of strong acid in the present invention, and it only needs to use a strong acid with a concentration used in a normal experiment; the soluble sulfate preferably includes zinc sulfate and/or copper sulfate; the titanate preferably includes tetraethyl titanate and/or tetrabutyl titanate; and in a particular embodiment of the present invention, the catalyst is preferably benzenesulfonic acid, tetraethyl titanate or tetrabutyl titanate.

The cation exchange resin preferably includes one or more of a strongly acidic styrene ion exchange resin, a CAT601 macroporous strongly acidic catalyst resin, and a C005 catalyst specific resin.

In the present invention, a mass ratio of the amount of the catalyst to isocyanatoethyl methacrylate is preferably 0.03-0.2:1, more preferably 0.05-0.15:1, and most preferably 0.1-0.12:1.

In the present invention, a molar ratio of the isocyanatoethyl methacrylate to the carboxyl group in the polyamic acid is preferably 0.2-1:1, and more preferably 0.3-0.5:1.

In the present invention, the reaction temperature of the isocyano reaction is preferably 70 to 100° C., and more preferably 80 to 90° C.; and a reaction time of the isocyano reaction is preferably 5 to 24 hours, and more preferably 8 to 12 hours.

Based on the weight percentage of the photocurable polyamic acid, the photocurable 3D printing polyimide ink provided by the present invention includes 5 to 40%, preferably 10 to 30%, and more preferably 20 to 25% of the organic solvent; in the present invention, the organic solvent preferably includes one or more of tetrahydrofuran, sulfolane, pyrrolidone, methyl halide, ketone organic solvents and amide organic solvents; the pyrrolidone preferably includes N-methylpyrrolidone and/or N—N-dimethylpyrrolidone; the methyl halide preferably includes one or more of dichloromethane, trichloromethane and tetrachloromethane; the ketone organic solvent preferably includes butanone and/or cyclohexanone; and the amide organic solvent preferably includes N—N-dimethylformamide and/or N—N-dimethyl acetamide.

Based on the weight percentage of the photocurable polyamic acid, the photocurable 3D printing polyimide ink provided by the present invention includes 10-50%, preferably 20-40%, and more preferably 30% of the reactive diluent; in the present invention, the reactive diluent preferably includes one or more of acrylic acid, styrene, γ-(methacryloyloxy)propyltrimethoxysilane, N-vinylpyrrolidone, cyclotrimethylolpropane formal acetal, glycidyl methacrylate and acrylate diluents; the acrylate diluent preferably includes one or more of polyethylene glycol diacrylate, 1,6-hexanediol diacrylate, tripropylene glycol diacrylate, lauryl methacrylate, butyl acrylate, tetrahydrofurfuryl acrylate, lauryl acrylate, and hydroxyethyl acrylate. In the present invention, the reactive diluent acts to dissolve the photocurable polyamic acid, and meanwhile to crosslink with the chain extender to generate a synergistic effect, thereby improving the crosslinking degree of photocuring and the mechanical properties of the cured device.

Based on the weight percentage of the photocurable polyamic acid, the photocurable 3D printing polyimide ink provided by the present invention includes 1 to 10%, preferably 3 to 8%, and more preferably 5 to 6% of the chain extender; in the present invention, the chain extender preferably includes one or more of acrylic acid, ethoxylated pentaerythritol tetraacrylate and trimethylol propane triacrylate; and the acrylic acid is preferably acrylic acid 8413 and/or acrylic acid 6282. In the present invention, the chain extender acts to crosslink with the molecular chain of the photocurable polyamic acid during the photocurable printing prototyping, so that the ink changes from a liquid state to a solid state under the action of ultraviolet light and can be cured into a molded device with relatively high mechanical strength.

Based on the weight percentage of the photocurable polyamic acid, the photocurable 3D printing polyimide ink provided by the present invention includes 1 to 3%, preferably 1.5 to 2.5%, and more preferably 2% of the photoinitiator. In the present invention, the photoinitiator preferably includes one or more of dimethoxybenzoin (photoinitiator-6512), benzophenone (winure BP), diacylphosphine oxide (Irgacure819), dibenzoyl peroxide (BPO), 2-hydroxy-2-methyl-1-phenylacetone (Irgacure 1173), 4-dimethylaminobenzoate (EDAB), azobisisobutyronitrile (AIBN), 1-hydroxycyclohexyl phenyl ketone (Irgacure184D) and 2-hydroxy-4'-(2-hydroxyethoxy)-2-methylpropiophenone (Irgacure 2959). In the present invention, the photoinitiator acts to absorb the ultraviolet light to conduct the photocuring reaction.

In addition to the above components, adjuvant materials can also be added into the photocurable 3D printing polyimide ink provided by the present invention according to the performance requirements; based on the weight percentage of the photocurable polyamic acid, the weight percentage of the adjuvant materials is preferably 1 to 3%, and more preferably 1.5 to 2%; and in the present invention, the adjuvant materials preferably include one or more of a leveling agent, a defoaming agent, an antioxidant, and a fluorescent whitening agent.

In the present invention, the leveling agent is preferably one or more of silicone oil, polydimethylsiloxane, polyether-polyester-modified organosiloxane, and alkyl-modified organosiloxane, and the leveling agent can effectively reduce the surface tension of a material and improve the surface smoothness of a material, has good compatibility and an anti-cratering effect, and is applicable to an ultraviolet (UV) curing system.

In the present invention, the defoaming agent is preferably a polyether defoaming agent and/or a high-alcohol defoaming agent; and the defoaming agent can reduce the generation of foam, reduce the shrinkage of a material, and improve the printing accuracy.

In the present invention, there is no special requirement for the type of the antioxidant, it only needs to use a normal antioxidant in the art, and in the embodiments, the antioxidant is preferably the antioxidant 1076 and/or the antioxidant TPP; and the antioxidant can retard or inhibit the progress of the polymer oxidation process, thereby preventing the aging of the printed device and prolonging the service life of the device.

In the present invention, the main component of the fluorescent whitening agent is stilbene biphenyl sodium disulfonate, which can excite the incident light to generate fluorescence, such that the dyed material obtains a sparkling effect like fluorite.

The present invention further provides a method for preparing the photocurable 3D printing polyimide ink as recited in the above technical solution, which includes the following steps:

mixing a photocurable polyamic acid, an organic solvent, a reactive diluent, a chain extender and a photoinitiator in weight percentages to obtain a mixed material; and centrifuging the mixed material to obtain a slurry, namely, the photocurable 3D printing polyimide ink.

There are no special requirements for the mixing order and mixing manner of the raw materials in the present invention, and it only needs to use a technical solution for preparing the mixed material as being well known to those skilled in the art; and in the present invention, the mixing preferably includes stirring at room temperature, there is no special requirement for parameters of the stirring process, and it only needs to stir at a normal stirring speed used in an experiment until the raw material can be completely dissolved, with the final purpose that no particulate matter can be observed under a microscope.

In the present invention, it is preferred that the photocurable polyamic acid is precipitated from a precipitating agent, dried to obtain a powdery photocurable polyamic acid, and then mixed with other raw materials to obtain a mixed material.

In the present invention, the precipitating agent preferably includes one or more of water, ethanol, methanol and toluene. In the present invention, there is no special requirement for conditions such as the use amount of the precipitating agent, the drying implementations and the temperature parameter, as long as a powdery product can be precipitated.

In the present invention, the particle size of the powdery photocurable polyamic acid is preferably from 10 nm to 1 mm, and more preferably from 500 nm to 100 μm; and the particle size of the powdery photocurable polyamic acid prepared by the present invention is relatively small, such that the dissolution rate is accelerated during ink preparation, and the ink uniformity is improved, and if the powdery particle is relatively large and thus the dissolution time is longer, the ink uniformity will be affected.

In the present invention, after the mixed material is obtained, it is preferred that the mixed material is centrifuged, and the resulting slurry is the photocurable 3D printing polyimide ink. In the present invention, a centrifugation rate is preferably from 5000 to 10000 r/min, and more preferably from 6000 to 8000 r/min; a centrifugation time is preferably from 10 to 20 min, more preferably from 12 to 18 min, and most preferably 15 min; and in the present invention, the purpose of centrifugation is to remove bubbles from the mixed material, to prevent generation of voids in the ink during printing prototyping, and to improve the mechanical properties of the printed device.

The present invention further provides the application of a photocurable 3D printing polyimide ink in 3D printing, and the 3D printing is preferably digital light-processing 3D printing, stereolithography 3D printing or photocuring-assisted direct extrusion 3D printing.

In the present invention, it is preferred that a model is constructed and then printed from the photocurable 3D printing polyimide ink by a 3D printer to obtain a device, then the printed device is subjected to imidization in a vacuum oven to obtain a finally shaped device; and in the present invention, the temperature rising program for imidization includes: the first stage: heating to 80° C. and maintaining for 1 h; the second stage: heating to 150° C. and maintaining for 1 h; the third stage: heating to 240° C. and maintaining for 1 h; the fourth stage: heating to 300° C. and maintaining for 1 h; and the fifth stage: heating to 350° C. and maintaining for 0.5 h. In the present invention there is no special requirement for the rate of heating to the maintained temperature of each stage, and the heating can be conducted at any rate.

A molded device obtained by 3D printing from the photocurable 3D printing polyimide ink provided by the present invention has advantages of high accuracy, good dimensional stability, high strength and corrosion resistance, excellent flexibility, high temperature resistance, low shrinkage and the like excellent performances. Therefore, the photocurable 3D printing polyimide ink of the present invention has broad application prospect and a great commercial value in many high-tech fields, such as aerospace, space, microelectronics, precision machinery, micro and nano manufacturing, medical machinery and the like.

The photocurable 3D printing polyimide ink provided by the present invention and the preparation method and application thereof are described in details below with reference to embodiments, but they should not be construed as limiting the scope of the present invention.

Embodiment 1

1) Preparation of photocurable polyamide acid: polyamic acid PI-100 having a molecular weight of 50,000 was mixed with 20 g of isocyanatoethyl methacrylate (where, the molar ratio of the carboxyl group to the isocyano group was 1:0.5), and reacted under the catalysis of 2 g of benzenesulfonic acid at a temperature of 70° C. for 18 h, to obtain a photocurable polyamic acid grafted with a methacryloyl reactive group, the grafting ratio being 50%; and 2) 60 g of the photocurable polyamic acid, 30 g of the N—N-dimethylformamide, 50 g of the ethylene glycol diacrylate, 10 g of the ethoxylated pentaerythritol tetraacrylate, and 2 g of the photoinitiator Irgacure819 were mixed uniformly under stirring at room temperature until completely dissolved and no particulate matter can be observed under a microscope, then centrifuged at a rotation rate of 5,000 r/min for 20 min to remove bubbles, so as to prepare a photocurable 3D printing polyimide ink.

A oil duct model was constructed and then printed from the printing ink prepared in this embodiment through a UV-assisted extrusion 3D printer to obtain a device; the device was placed into a vacuum oven and subjected to the following temperature rising program: the first stage: heating to 80° C. and maintaining for 1 h; the second stage: heating to 150° C. and maintaining for 1 h; the third stage: heating to 240° C. and maintaining for 1 h; the fourth stage: heating to 300° C. and maintaining for 1 h; and the fifth stage: heating to 350° C. and maintaining for 0.5 h, so as to conduct imidization to obtain a molded device oil duct, as shown in FIG. 1.

FIG. 1 shows the molded device oil duct prepared in Embodiment 1 of the present invention, and it can be seen from FIG. 1 that the photocurable 3D printing polyimide ink prepared by the present invention can be used to successfully print a molded device, and the resulting device has a smooth surface, has neither large shrinkage nor cracking after subjected to imidization at high temperature. The accuracy, dimensional stability, heat resistance and related mechanical properties of the device oil duct were tested through experiments.

Testing of accuracy and properties: the testing of accuracy was mainly based on the smallest dimension that can be prepared through printing in a printing process; the testing of dimensional stability was mainly characterized by the difference between the printed dimension and the original dimension and the percentage of the original dimension; the heat resistance was represented based on the glass transition temperature; and the mechanical properties can be tested just using normal experimental detection methods.

The characterization results of the properties of the oil duct molded device obtained in Embodiment 1 are listed in the table below:

Embodiment 2

1) Preparation of photocurable polyamide acid: polyamic acid PAA having a molecular weight of 20,000 was mixed with 10 g of isocyanatoethyl methacrylate (where, the molar ratio of the carboxyl group to the isocyano group was 1:0.4), and reacted under the catalysis of 2 g of tetraethyl titanate at a temperature of 100° C. for 12 h, precipitated in a methanol solution and dried to obtain a photocurable polyamic acid grafted with a methacryloyl reactive group, the grafting ratio being 40%; and 2) 50 g of the photocurable polyamic acid, 40 g of the N-methylpyrrolidone, 30 g of styrene, 10 g of photocurable resin acrylic acid 8413, and 3 g of the photoinitiator Irgacure819 were mixed uniformly under stirring at room temperature until completely dissolved and no particulate matter can be observed under a microscope, then centrifuged at a rotation rate of 10,000 r/min for 10 min to remove bubbles, so as to prepare a photocurable 3D printing polyimide ink.

A network framework model was constructed and then printed from the printing ink prepared in this embodiment through a UV-assisted extrusion 3D printer to obtain a device; the device was placed into a vacuum oven and subjected to the following temperature rising program: the first stage: heating to 80° C. and maintaining for 1 h; the second stage: heating to 150° C. and maintaining for 1 h; the third stage: heating to 240° C. and maintaining for 1 h; the fourth stage: heating to 300° C. and maintaining for 1 h; and the fifth stage: heating to 350° C. and maintaining for 0.5 h, so as to conduct imidization to obtain a molded device network framework, as shown in FIG. 1b.

Figure 2:
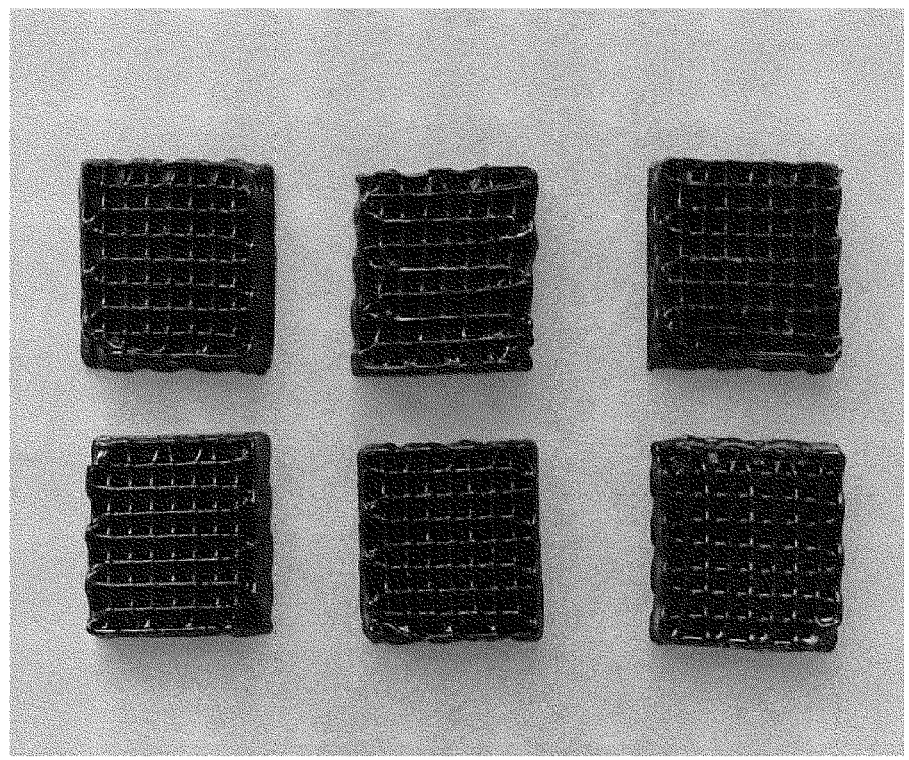
FIG. 2 is a network framework obtained through 3D printing from a photocurable 3D printing polyimide ink prepared in an Embodiment 2 of the invention described below.

FIG. 2 shows the molded device network framework prepared in Embodiment 2 of the present invention, and it can be seen from FIG. 2 that the photocurable 3D printing polyimide ink prepared by the present invention can be used to successfully print a molded device network framework, and the resulting device has a smooth surface, has neither large shrinkage nor cracking after subjected to imidization at high temperature.

Figure 3:
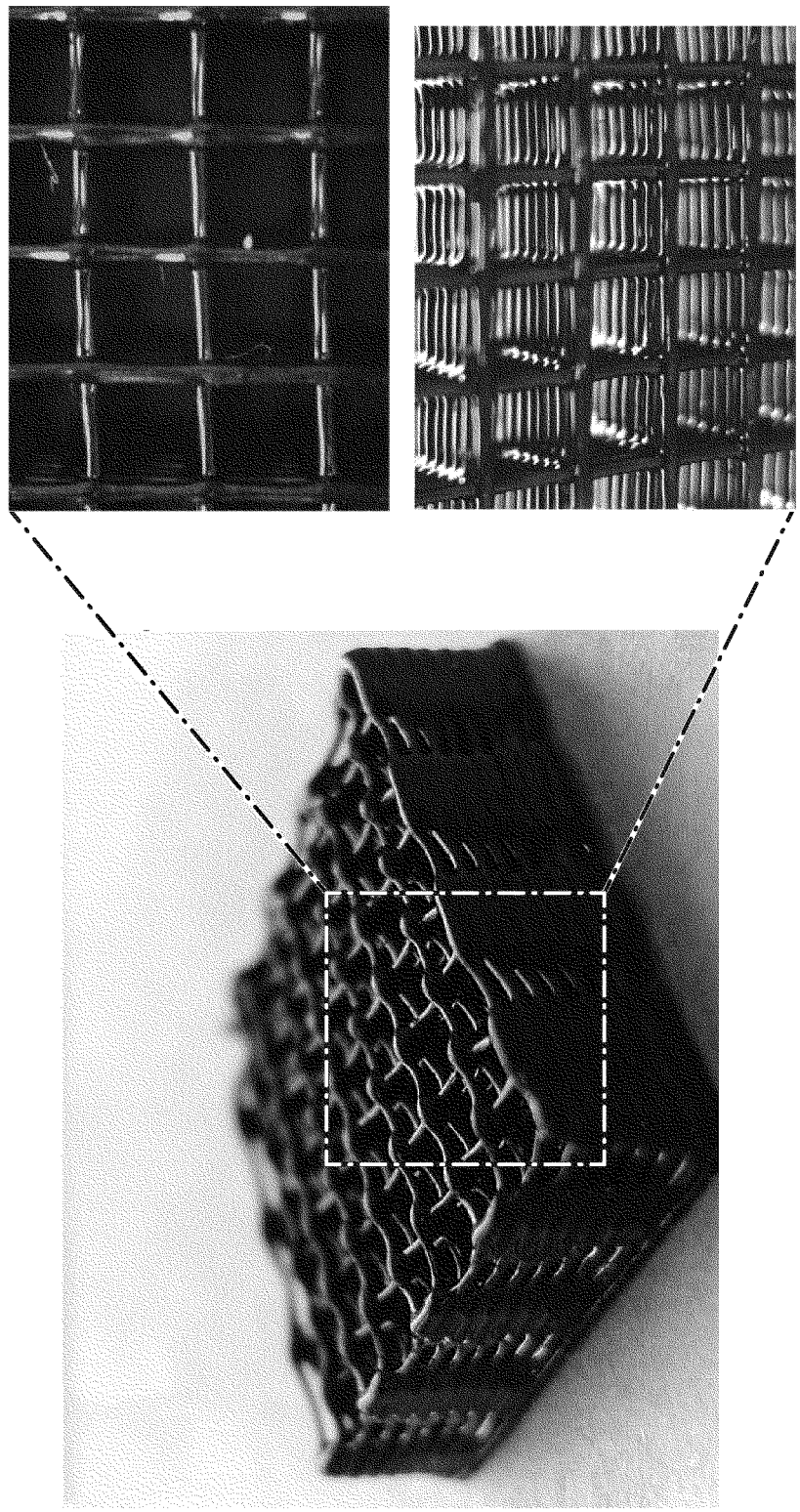
FIG. 3 is a partially enlarged view (upper right) of a surface and an enlarged view of an internal structure (lower right) of the network framework prepared in Embodiment 2.

FIG. 3 is a partially enlarged view (upper right) of a surface and an enlarged view of an internal structure (lower right) of the network framework prepared in Embodiment 2; and it can be seen from FIG. 3 that the present invention prepares a network framework structural member which cannot be prepared by conventional manufacturing, the internal structure of the network framework structural member is clearly-layered and has no mutual adhesion, which shows that the ink has excellent modeling accuracy and dimensional stability. The accuracy, dimensional stability, heat resistance and related mechanical properties of the network framework device were tested through experiments.

The characterization results of the properties of the molded device network framework obtained in Embodiment 2 are listed in the table below:

| Glass Transition Temperature (° C.) | Tensile Strength (MPa) | Breaking Elongation (%) | Hardness (MPa) | Elastic Modulus (MPa) | Shrinkage (%) | Printing Accuracy (μm) | Dimensional Stability (%) |
|---|---|---|---|---|---|---|---|
| 254 | 105 | 15 | 500 | 3100 | 4.5 | 150 | 1.3 |

| Glass Transition Temperature (° C.) | Tensile Strength (MPa) | Breaking Elongation (%) | Hardness (MPa) | Elastic Modulus (MPa) | Shrinkage (%) | Printing Accuracy (μm) | Dimensional Stability (%) |
|---|---|---|---|---|---|---|---|
| 300 | 135 | 20 | 700 | 3550 | 5.2 | 135 | 2 |

Embodiment 3

1) Preparation of photocurable polyamide acid: polyamic acid PI1000 having a molecular weight of 2,000 was mixed with 20 g of isocyanatoethyl methacrylate (where, the molar ratio of the carboxyl group to the isocyano group was 1:0.3), and reacted under the catalysis of 1 g of zinc oxide at a temperature of 80° C. for 14 h, precipitated in a aqueous solution and dried to obtain a powdery photocurable polyamic acid grafted with a methacryloyl reactive group, the grafting ratio being 30%; and 2) 40 g of the photocurable polyamic acid, 10 g of the cyclohexanone, 10 g of the N-vinylpyrrolidone, 2 g of the photocurable resin ethoxylated pentaerythritol tetraacrylate, and 1 g of the photoinitiator AIBN were mixed uniformly under stirring at room temperature until completely dissolved and no particulate matter can be observed under a microscope, then centrifuged at a rotation rate of 6,000 r/min for 10 min to remove bubbles, so as to prepare a photocurable 3D printing polyimide ink.

A device was printed from the polyimide ink prepared in this embodiment through a digital light-processing 3D printing; the device was placed into a vacuum oven and subjected to the following temperature rising program: the first stage: heating to 80° C. and maintaining for 1 h; the second stage: heating to 150° C. and maintaining for 1 h; the third stage: heating to 240° C. and maintaining for 1 h; the fourth stage: heating to 300° C. and maintaining for 1 h; and the fifth stage: heating to 350° C. and maintaining for 0.5 h, so as to conduct imidization to obtain a molded device. The accuracy, dimensional stability, heat resistance and related mechanical properties of the device were tested through experiments.

The characterization results of the properties of the molded device obtained in Embodiment 3 are listed in the table below:

| Glass Transition Temperature (° C.) | Tensile Strength (MPa) | Breaking Elongation (%) | Hardness (MPa) | Elastic Modulus (MPa) | Shrinkage (%) | Printing Accuracy (μm) | Dimensional Stability (%) |
|---|---|---|---|---|---|---|---|
| 270 | 120 | 20 | 640 | 3215 | 4.6 | 135 | 1.5 |

Embodiment 4

1) Preparation of photocurable polyamide acid: polyamic acid PY1001 having a molecular weight of 100,000 was mixed with 20 g of isocyanatoethyl methacrylate (where, the molar ratio of the carboxyl group to the isocyano group was 1:0.2), and reacted under the catalysis of 0.6 g of copper sulfate at a temperature of 90° C. for 12 h, precipitated in a toluene solution and dried to obtain a powdery photocurable polyamic acid grafted with a methacryloyl reactive group, the grafting ratio being 20%; and 2) 45 g of the photocurable polyamic acid, 20 g of sulfolane, 30 g of glycidyl methacrylate, 1 g of photocurable resin acrylic acid 8413, and 3 g of the photoinitiator Irgacure2959 were mixed uniformly under stirring at room temperature until completely dissolved and no particulate matter can be observed under a microscope, then centrifuged at a rotation rate of 8,000 r/min for 10 min to remove bubbles, so as to prepare a photocurable 3D printing polyimide ink.

A device was printed from the printing ink prepared in this embodiment through a stereolithography 3D printing; the device was placed into a vacuum oven and subjected to the following temperature rising program: the first stage: heating to 80° C. and maintaining for 1 h; the second stage: heating to 150° C. and maintaining for 1 h; the third stage: heating to 240° C. and maintaining for 1 h; the fourth stage: heating to 300° C. and maintaining for 1 h; and the fifth stage: heating to 350° C. and maintaining for 0.5 h, so as to conduct imidization to obtain a molded device. The accuracy, dimensional stability, heat resistance and related mechanical properties of the device were tested through experiments.

The characterization results of the properties of the molded device obtained in Embodiment 4 are listed in the table below:

| Glass Transition Temperature (° C.) | Tensile Strength (MPa) | Breaking Elongation (%) | Hardness (MPa) | Elastic Modulus (MPa) | Shrinkage (%) | Printing Accuracy (μm) | Dimensional Stability (%) |
|---|---|---|---|---|---|---|---|
| 278 | 114 | 19 | 546 | 3350 | 4.8 | 145 | 1.8 |

Embodiment 5

1) Preparation of photocurable polyamide acid: polyamic acid PI-84 having a molecular weight of 20,000 was mixed with 10 g of isocyanatoethyl methacrylate (where, the molar ratio of the hydroxy group to the methacrylate group was 1:0.5), and reacted under the catalysis of 1.5 g of cation exchange resin at a temperature of 70° C. for 10 h, precipitated in a methanol solution and dried to obtain a powdery photocurable polyamic acid grafted with a methacryloyl reactive group, the grafting ratio being 50%; and 2) 55 g of the photocurable polyamic acid, 30 g of tetrahydrofuran, 40 g of butyl acrylate, 8 g of trimethylol propane triacrylate, 2 g of the photoinitiator winure BP, and 3 g of the antioxidant 1076 were mixed uniformly under stirring at room temperature until completely dissolved and no particulate matter can be observed under a microscope, then centrifuged at a rotation rate of 5,000 r/min for 15 min to remove bubbles, so as to prepare a photocurable 3D printing polyimide ink.

A model was constructed and then printed from the printing ink prepared in this embodiment through a UV-assisted extrusion 3D printer to obtain a device; the device was placed into a vacuum oven and subjected to the following temperature rising program: the first stage: heating to 80° C. and maintaining for 1 h; the second stage: heating to 150° C. and maintaining for 1 h; the third stage: heating to 240° C. and maintaining for 1 h; the fourth stage: heating to 300° C. and maintaining for 1 h; and the fifth stage: heating to 350° C. and maintaining for 0.5 h, so as to conduct imidization to obtain a molded device. The accuracy, dimensional stability, heat resistance and related mechanical properties of the device were tested through experiments.

The characterization results of the properties of the molded device obtained in Embodiment 5 are listed in the table below:

Embodiment 6

1) Preparation of photocurable polyamide acid: polyamic acid TPI having a molecular weight of 80,000 was mixed with 20 g of isocyanatoethyl methacrylate (where, the molar ratio of the hydroxy group to the methacrylate group was 1:0.2), and reacted under the catalysis of 2 g of concentrated sulfuric acid at a temperature of 85° C. for 15 h, precipitated in a methanol solution and dried to obtain a powdery photocurable polyamic acid grafted with a methacryloyl reactive group, the grafting ratio being 50%; and 2) 50 g of the photocurable polyamic acid, 40 g of dichloromethane, 50 g of lauryl methacrylate, 5 g of photocurable resin acrylic acid 6282, 3 g of the photoinitiator Irgacure184D, 2 g of the high-alcohol defoaming agent and 1 g of the fluorescent whitening agent were mixed uniformly under stirring at room temperature until completely dissolved and no particulate matter can be observed under a microscope, then centrifuged at a rotation rate of 8,000 r/min for 12 min to remove bubbles, so as to prepare a photocurable 3D printing polyimide ink.

A model was constructed and then printed from the printing ink prepared in this embodiment through a stereolithography 3D printer to obtain a device; the device was placed into a vacuum oven and subjected to the following temperature rising program: the first stage: heating to 80° C. and maintaining for 1 h; the second stage: heating to 150° C. and maintaining for 1 h; the third stage: heating to 240° C. and maintaining for 1 h; the fourth stage: heating to 300° C. and maintaining for 1 h; and the fifth stage: heating to 350° C. and maintaining for 0.5 h, so as to conduct imidization to obtain a molded device. The accuracy, dimensional stability, heat resistance and related mechanical properties of the device were tested through experiments.

The characterization results of the properties of the molded device obtained in Embodiment 6 are listed in the table below:

| Glass Transition Temperature (° C.) | Tensile Strength (MPa) | Breaking Elongation (%) | Hardness (MPa) | Elastic Modulus (MPa) | Shrinkage (%) | Printing Accuracy (μm) | Dimensional Stability (%) |
|---|---|---|---|---|---|---|---|
| 295 | 132 | 20 | 650 | 3260 | 5.0 | 140 | 1.6 |

| Glass Transition Temperature (° C.) | Tensile Strength (MPa) | Breaking Elongation (%) | Hardness (MPa) | Elastic Modulus (MPa) | Shrinkage (%) | Printing Accuracy (μm) | Dimensional Stability (%) |
|---|---|---|---|---|---|---|---|
| 287 | 130 | 18 | 680 | 3500 | 4.5 | 150 | 1.5 |

Several examples are used for illustration of the principles and implementation methods of the present invention. The description of the embodiments is used to help illustrate the method and its core principles of the present invention. In addition, those skilled in the art can make various modifications in terms of specific embodiments and scope of application in accordance with the teachings of the present invention. In conclusion, the contents of this specification shall not be construed as a limitation to the invention.

What is claimed is:

1. A photocurable 3D printing polyimide ink, comprising the following components in corresponding weight percentages:
    a photocurable polyamide acid: 39.9%;
    an organic solvent: 21.7%;
    a reactive diluent: 29.0%;
    a chain extender: 5.8%; and
    a photoinitiator: 1.4%,
    wherein the photocurable polyamide acid is a polyamic acid grafted with a methacryloyl reactive group in a backbone structure, and a grafting ratio of the methacryloyl reactive group is from 10% to 50%.

2. The photocurable 3D printing polyimide ink of claim 1, wherein the organic solvent comprises one or more of tetrahydrofuran, sulfolane, pyrrolidone, methyl halide, ketone organic solvents and amide organic solvents.

3. The photocurable 3D printing polyimide ink of claim 1, wherein the reactive diluent comprises one or more of acrylic acid, styrene, γ-(methacryloyloxy)propyltrimethoxysilane, N-vinylpyrrolidone, cyclotrimethylolpropane formal acetal, glycidyl methacrylate and acrylate diluents.

4. The photocurable 3D printing polyimide ink of claim 1, wherein the chain extender comprises one or more of acrylic acid, ethoxylated pentaerythritol tetraacrylate and trimethylol propane triacrylate.

5. The photocurable 3D printing polyimide ink of claim 1, wherein the photoinitiator comprises one or more of dimethoxybenzoin, benzophenone, diacylphosphine oxide, dibenzoyl peroxide, 2-hydroxy-2-methyl-1-phenylacetone, ethyl 4-dimethylaminobenzoate, azobisisobutyronitrile, 1-hydroxycyclohexyl phenyl ketone, and 2-hydroxy-4'-(2-hydroxyethoxy)-2-methylpropiophenone.

6. A method for preparing a photocurable 3D printing polyimide ink, comprising steps of:
    mixing a photocurable polyamic acid, an organic solvent, a reactive diluent, a chain extender and a photoinitiator in corresponding weight percentages to obtain a mixed material; and
    centrifuging the mixed material to obtain a slurry, namely, the photocurable 3D printing polyimide ink,
    wherein the step of mixing further includes mixing components in the corresponding weight percentages as follows:
    a photocurable polyamide acid: 39.9%;
    an organic solvent: 21.7%;
    a reactive diluent: 29.0%;
    a chain extender: 5.8%; and
    a photoinitiator: 1.4%,
    wherein the photocurable polyamide acid is a polyamic acid grafted with a methacryloyl reactive group in a backbone structure, and a grafting ratio of the methacryloyl reactive group is from 10% to 50%.

7. The method of claim 6, wherein a centrifugation rate is from 5,000 to 10,000 r/min, and a centrifugation time is from 10 to 20 min.

8. A method of 3D printing a part, comprising:
    providing a photocurable 3D printing polyimide ink, comprising the following components in corresponding weight percentages:
    a photocurable polyamide acid: 39.9%;
    an organic solvent: 21.7%;
    a reactive diluent: 29.0%;
    a chain extender: 5.8%; and
    a photoinitiator: 1.4%,
    wherein the photocurable polyamide acid is a polyamic acid grafted with a methacryloyl reactive group in a backbone structure, and a grafting ratio of the methacryloyl reactive group is from 10% to 50%, and
    printing the part using additive manufacturing with the photocurable 3D printing polyimide ink.

* * * * *